UNITED STATES PATENT OFFICE.

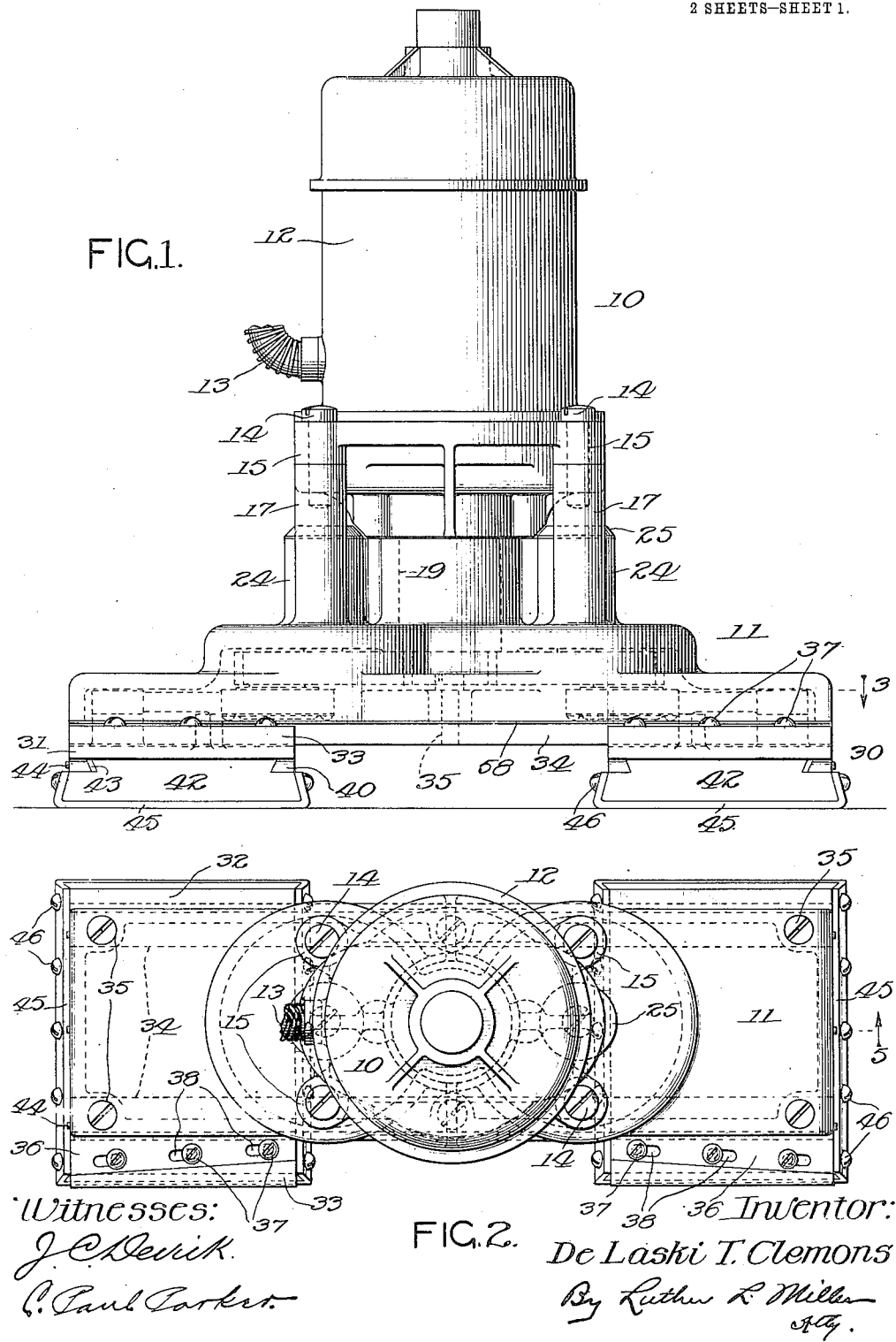

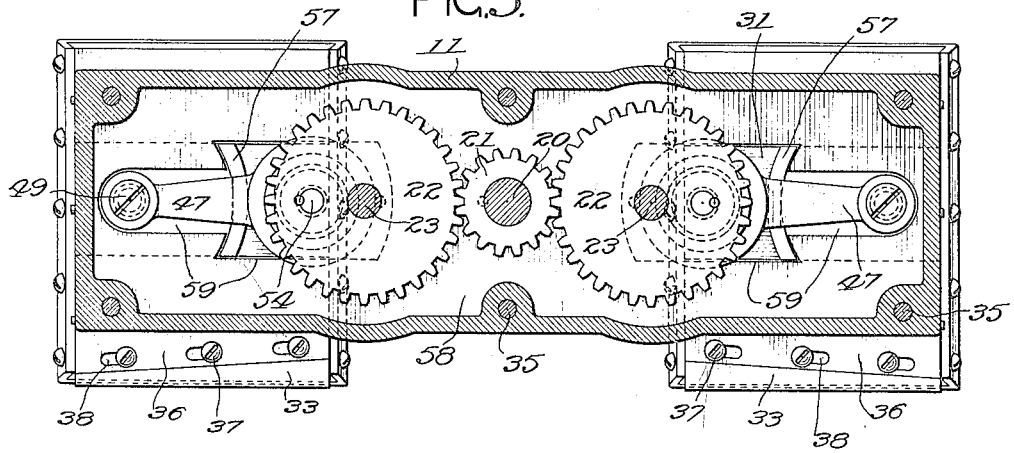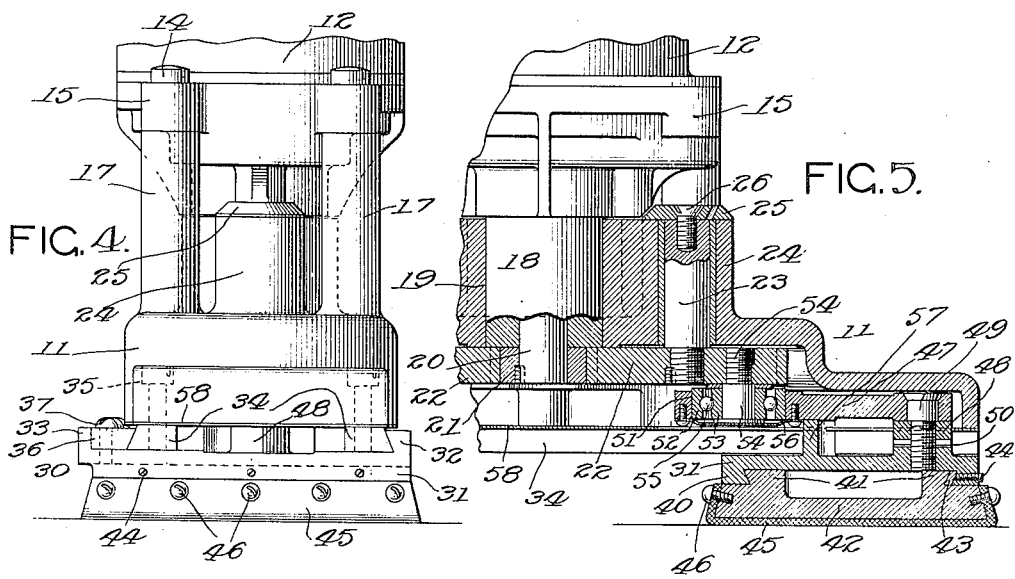

DE LASKI T. CLEMONS, OF HORNELL, NEW YORK, ASSIGNOR TO C. MATTISON MACHINE WORKS, OF BELOIT, WISCONSIN, A CORPORATION OF WISCONSIN.

RUBBING OR POLISHING MACHINE.

1,123,097. Specification of Letters Patent. Patented Dec. 29, 1914.

Application filed April 28, 1913. Serial No. 764,001.

*To all whom it may concern:*

Be it known that I, DE LASKI T. CLEMONS, a citizen of the United States, residing at Hornell, in the county of Steuben and State of New York, have invented certain new and useful Improvements in Rubbing or Polishing Machines, of which the following is a specification.

This invention relates to a machine for finishing or polishing the surfaces of various articles of manufacture, but it refers more particularly to a machine adapted for rubbing the surface of furniture during the process of "finishing" such surface.

One of the objects of the invention is to provide an improved machine of this character which is of small and compact construction so that it will be portable.

It has heretofore been proposed to construct a portable machine which is arranged to be operated by compressed air.

It is one of the objects of my invention to provide a portable machine which embodies an electric motor for driving the operating mechanism. When an electric driving motor is used, power may be supplied thereto through a suitable cable which may be connected to any one of a suitable number of sources of current located in various parts of a shop. It is more satisfactory to provide a suitable number of power sockets in the desired places in a work shop for the connection of an electric motor than it is to provide a similar number of sources of supply of compressed air.

A further object of the invention is to provide a machine which will be simple and durable in construction and highly efficient in its operation.

In the accompanying drawings, Figure 1 is a side elevation of a machine embodying the features of my invention. Fig. 2 is a top plan view. Fig. 3 is a horizontal section in an irregular plane on line 3 of Fig. 1. Fig. 4 is a fragmental end elevation of the machine taken from the right-hand end of Fig. 1. Fig. 5 is a vertical sectional detail view illustrating the operating parts of the machine.

In its preferred form which I have shown in the drawings, the machine comprises an upper portion 10 and an elongated lower portion 11. The upper portion comprises a housing 12 which may constitute the casing of an electric motor, the latter preferably being positioned with its shaft extending in a vertical direction.

13 indicates a cable containing wire to convey current to the motor. The upper and lower sections 10 and 11 are secured together by means of screws 14 which pass through lugs 15 on the upper section, which lugs rest upon vertical posts 17 on the lower section, the screws 14 being threaded into said vertical posts. The lower portion of the casing 12 is somewhat irregular in shape and has a bearing 18 (Fig. 5) extending downwardly therefrom and fitting into an opening 19 in the lower section 11. In the bearing 18 is rotatably mounted a drive shaft 20. This shaft may be a continuation of the armature shaft of the motor, but preferably the shaft is separate from the armature shaft and is geared to the latter by suitable change-speed gears located within the casing 12 and not shown in the drawings, said gears being arranged to translate the high speed of the motor into a lower speed of the drive shaft 20.

Upon the lower end of the shaft 20 is fixed a pinion 21, and with this pinion a pair of gear wheels 22 are arranged to mesh. The gear wheels 22 are fixed upon the lower ends of vertical shafts 23 which are rotatably mounted in bearings 24 in the lower section 11. The shafts 23 may be held in their bearings in any suitable manner as by means of cap plates 25 secured to the upper ends of said shafts by screws 26, the cap plates overlying tne bearing openings in which the shafts turn. The gears 22 are provided with wrist pins which are connected to a pair of rubbing heads mounted for reciprocation at opposite ends of and beneath the lower section 11. In use, these rubbing heads rest upon the surface to be finished and form the sole support for the machine. The rubbing heads and the means for connecting them to the gears 22 may be substantially identical, and a description of one will suffice for both.

Each of the rubbing heads 30 comprises a slide 31 provided with a pair of oppositely disposed ribs 32 and 33 on its upper side. A pair of guide rails 34 extend longitudinally along the entire under side of the lower section 11 and are fixed thereto by suitable means such as screws 35. The outer sides of these guide rails are beveled, and the rib 32 on the slide 31 is undercut to complement this beveled side. (See Fig. 2.) The other rib 33 is provided with an inclined inner side, and between this rib and the adjacent guide rail 34 is positioned a plate 36 having an inclined outer side and having a beveled inner side to complement the beveled face of the guide rail. The plate 36 is adjustably secured to the slide 31 by means of screws 37 extending through elongated slots 38 in said plate and threaded in said slide. The slide is arranged to move along the guide rails 34, and any wear upon the rails 34, the rib 32 and the plate 36 may be taken up by longitudinally adjusting said plate.

The lower side of the slide 31 is provided with a pair of undercut ribs 40 arranged to dove-tail with a similar rib or ribs 41 on the upper side of a polishing shoe 42, the ribs 40 and 41 for the shoe extending transversely of the ribs 32 and 33 and the guide rails 34. A gib 43 (Fig. 5) may be inserted between one pair of the ribs 40 and 41, and said gib is arranged to be moved by means of a suitable number of screws 44 threaded in the adjacent rib 40 to clamp the ribs 40 and 41 in frictional engagement with each other and thus lock the polishing shoe 42 to the slide 31. To the under side of the shoe 42 is fixed a layer of suitable material 45, preferably felt, the edges of the felt being carried up and suitably secured to the sides of the shoe as by means of screws 46. Obviously the machine may be adapted for sand-papering by attaching abrading sheets to the rubbing heads.

Each of the slides 31 is connected to one of the gear wheels 22 by means of a pitman 47. One end of said pitman overlies a boss 48 on the slide 31, and a pivot pin 49 extends through an opening in the pitman and is threaded into said boss, the pin being held against rotation in any suitable manner as by a key 50. The opposite end of the pitman 47 has an opening 51 in which a ring 52 is fixed. Another ring 53 is positioned within the ring 52, the former being rigid with a wrist pin 54 which is fixed in the gear wheel 22. The rings 52 and 53 have annular recesses therein in which a series of anti-friction balls 55 travel. A pan 56 having its edges secured to the under side of the crank around the opening 51 is arranged to prevent the escape of lubricant from the bearing. Preferably, the pitman 47 rests upon an arcuate lug 57 projecting upwardly from the slide 31, the upper end of said lug and the under side of the pitman 47 sliding in contact with each other.

The lower side of the section 11 is preferably closed by a plate 58 which may be of sheet metal, the edges of said plate, in the present instance, lying between the walls of said section 11 and the guide rails 34. The screws 35 and rails 34 thus serve to hold the plate 58 in place. Said plate is provided at opposite ends with openings 59 through which the bosses 48 and the arcuate lugs 57 on the slides 31 project, said openings being of sufficient length to permit said parts to move through their reciprocations. The plate 58 serves to catch any oil which may drip from the moving parts above it.

In operation, when the electric motor is driven the pinion 21 will rotate the gear wheels 22 to reciprocate the rubbing shoes through the medium of the pitmen 47. As illustrated in Fig. 3, the parts are so arranged that the polishing shoes reciprocate toward and away from each other; that is to say, the shoes move toward the center of the machine at the same time, and likewise toward the ends of the machine. In this way a perfect balance of the machine is maintained at all times.

In use, the machine may be carried to the work to be finished and set upon the work. The weight of the machine rests upon the rubbing heads and as the heads reciprocate, the surface will be rubbed or polished. The machine will remain in substantially the position in which it is placed and may be moved at times from one point to another over the work until the work has been finished as much as desired.

While I have herein shown that embodiment of my invention which is preferred, I would have it understood that the invention is not limited to the exact construction illustrated, but may be modified in various ways without departing from its spirit and scope.

I claim as my invention:

1. A rubbing machine comprising a body having a pair of guide rails secured to the lower portion thereof and extending longitudinally along opposite sides, a pair of slides mounted at opposite ends of said body and having portions interengaging with said guide rails and being slidable longitudinally along said rails directly toward and away from each other, means for reciprocating said slides, guides on the lower side of each of said slides extending transversely to said guide rails, and rubbing shoes having portions to interengage with said guides, said shoes being removable from said slides at will.

2. A rubbing machine comprising a body, a pair of guide rails secured to the lower side of said body, a slide having a pair of ribs upon its upper side, one of said ribs interengaging with one of said guide rails, a plate positioned between the other rib and the other guide rail; said plate and said guide rail interengaging, said plate being adjustable in position to take up wear on the contacting parts, and a rubbing shoe carried by said slide.

3. A rubbing machine comprising a body having a pair of guide rails on its under side, a rubbing head having a pair of ribs on its upper side, one of said ribs interengaging with one of said guide rails, a plate positioned between the other rib and the other guide rail and interengaging with the latter, the adjacent edges of said plate and its rib extending at an angle to said guide rails, and screws extending through slots in said plate and threaded in said slide for adjustably securing said plate in place.

4. A portable rubbing machine comprising a support, a vertical drive shaft mounted therein, an electric motor mounted on said support above said shaft for driving the latter, a pair of vertical shafts mounted in the support, a gear wheel on each of the latter shafts, a single horizontal pinion on said drive shaft meshing with both of said gear wheels, guide rails at the under side of said support, a pair of rubbing heads reciprocably mounted on said opposite ends of rails to move directly toward and away from each other, a wrist pin carried directly by each of said gear wheels, and a pair of pitmen each connecting one of said wrist pins to one of said rubbing heads.

5. A rubbing machine comprising a support, a vertical drive shaft mounted therein, a pinion fixed on said shaft, a horizontal gear meshing with said pinion, a rubbing slide reciprocably mounted beneath said support, a wrist pin fixed to the under side of said gear wheel, a pitman connecting said wrist pin to said rubbing slide, and a lug on the upper side of said slide, at a distance from the connecting point of said pitman, said lug being arranged to engage the under side of said pitman.

6. In a portable rubbing machine, the combination of an elongated lower section of generally rectangular form, a circular upper section disposed with its axis vertical and mounted on the midportion of the lower section, the latter having an opening therein and the upper section having a vertical bearing projecting downwardly therefrom into said opening, a vertical drive-shaft mounted in said bearing, an electric motor comprised in said upper section and arranged to rotate said drive-shaft, a pair of rubbing heads positioned beneath the lower section at opposite ends thereof, the lower section having longitudinally extending guideways along which the rubbing heads move directly toward and away from each other, and an operative connection between said rubbing heads and said drive-shaft.

7. In a portable rubbing machine, the combination of an upper section and a lower section, said upper section having a vertical bearing projecting downwardly into an opening in the lower section, a vertical drive shaft rotatably mounted in said bearing, an electric motor comprised in said upper section and arranged to drive said shaft, a pair of vertical shafts mounted in bearings in said lower section, a gear fixed on the lower end of each of the last mentioned shafts, a pinion fixed on said drive shaft and meshing with both of said gears, a pair of guide rails fixed to the lower side of the lower section, a pair of slides reciprocably mounted on said guide rails, pitmen each connecting one of said slides to one of said gear wheels, and a pair of rubbing shoes mounted on the under side of said slides and being withdrawable from said slides in a direction transverse to said guide rails.

8. In a portable rubbing machine, the combination of an elongated body portion of generally rectangular form, a continuously rotated vertical drive-shaft mounted at the central part of said body portion, an electric motor mounted on the midportion of the body above said drive-shaft and connected to the latter, said body portion having guideways at its lower portion extending longitudinally thereof, a pair of rubbing heads positioned beneath opposite ends of the body portion and arranged to move along said guideways directly toward and away from each other, a pair of cranks associated with said drive-shaft, and a pair of pitmen each connected at one end to one of said cranks, said pitmen extending in opposite directions away from said drive-shaft and each being pivoted at the other end to one of said rubbing heads.

In testimony whereof I affix my signature in the presence of two witnesses.

DE LASKI T. CLEMONS.

Witnesses:
J. A. NICHOLS,
R. A. PLAISTED.